July 27, 1926.

H. C. HAYES 1,593,972

APPARATUS FOR DETERMINING RANGES BY MEANS OF SOUND WAVES

Filed June 30, 1924　　2 Sheets-Sheet 1

Inventor
HARVEY C. HAYES

By John J. Fitzgerald
Attorney

Inventor
HARVEY C. HAYES
By John J. Fitzgerald
Attorney

Patented July 27, 1926.

1,593,972

UNITED STATES PATENT OFFICE.

HARVEY C. HAYES, OF WASHINGTON, DISTRICT OF COLUMBIA.

APPARATUS FOR DETERMINING RANGES BY MEANS OF SOUND WAVES.

Application filed June 30, 1924. Serial No. 723,428.

My invention relates generally to a system for determining ranges by means of sound waves, but more particularly to a means for eliminating the direct signals and collecting the reflected signals.

A further object of my invention is the employment, in an apparatus for determining ranges by means of sound waves, of a unit consisting of a plurality of transmitters and a unit consisting of a plurality of receivers.

Figure 1:
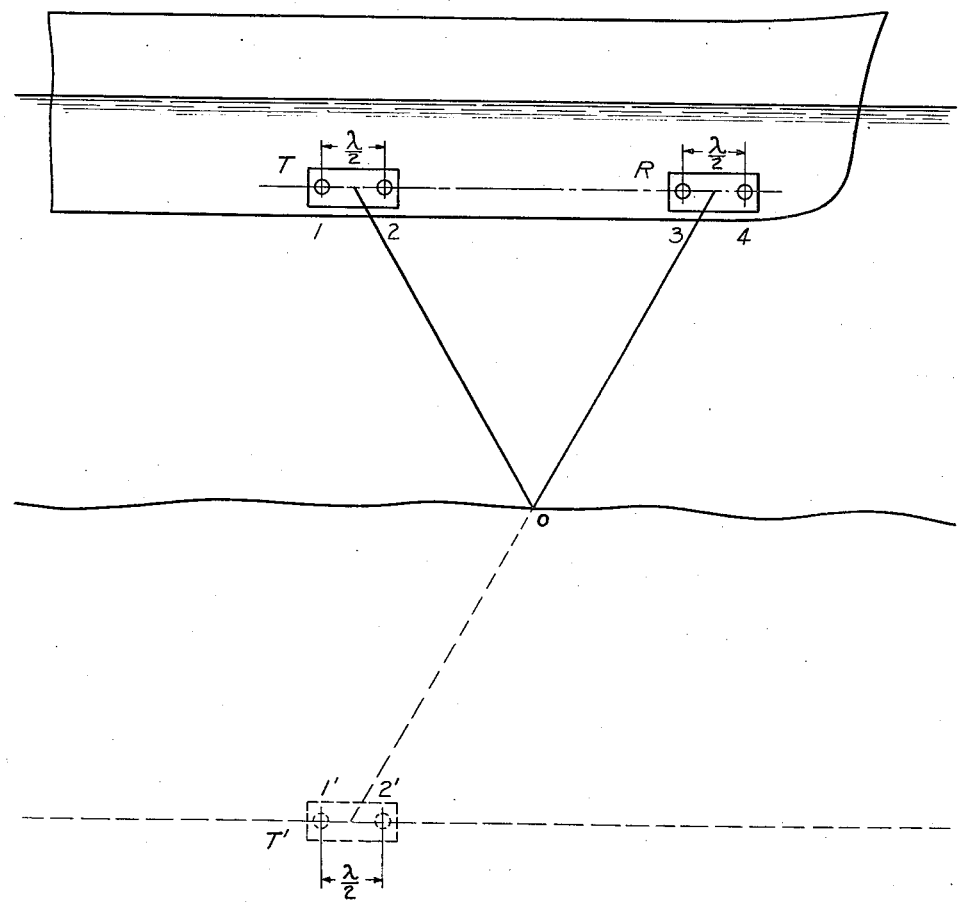
Figure 2:
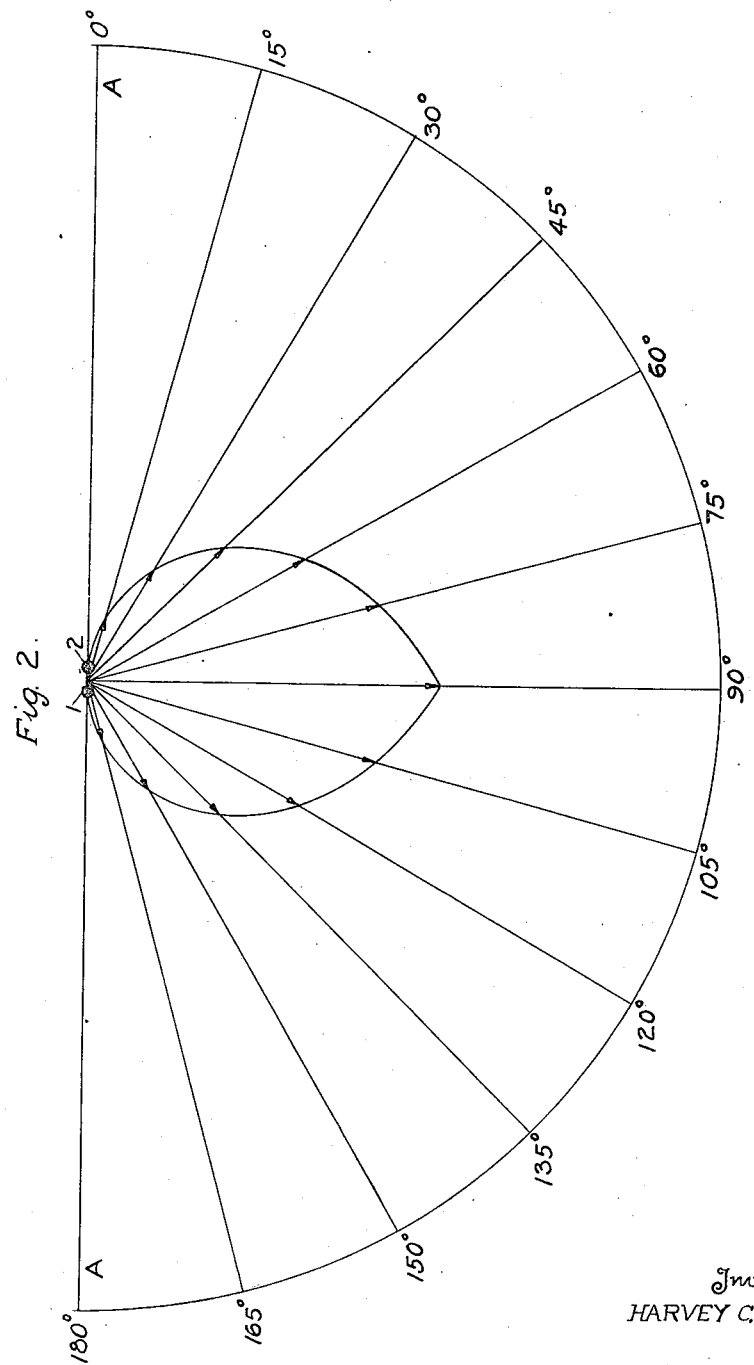

With these and other objects in view my invention can be best understood by reference to the accompanying drawings in which Figure 1 is a schematic drawing of my invention and Fig. 2 is a diagrammatic sketch showing the relation between the intensity of the received sound and the direction with respect to the line (A—A).

Referring to Figure 1, T is a unit consisting of two or more like transmitters and R is a unit consisting of two or more like receivers, wherein 1 and 2 are two like transmitters and 3 and 4 are two like receivers, the two units T and R being mounted along an approximately straight line A—A which, in the case of a ship, may preferably be parallel with the keel.

If transmitters (1) and (2) are energized by the same alternating E. M. F., being connected in either series or parallel, the sound output from the two will be in phase and as a result the intensity of the combined sound output at any point outside the vessel's hull will be equal to the vector sum of the intensity at the point furnished by each transmitter separately. For points on the line (A—A) this sum will approximate zero for the reason that the direction of the two vectors will differ by 180 degrees. And if the intensity furnished by each transmitter at any point on this line were equal the vector sum would be exactly zero and no sound would be heard on a receiver placed at that point. For all points off of this line the vector sum cannot be zero because the two vectors are not displaced 180 degrees with respect to one another and hence the direct sound from the transmitters will be heard on a receiver placed at such a point.

From the above it is obvious that neither receiver (3) nor (4) responds with much intensity to the direct sound from the two transmitters (1) and (2), but that each will respond to the echo of the sound as reflected at point (0) on the sea-bottom or other reflecting surface unless this point of reflection happens to be located on the line (A—A), for we may for convenience consider the source as points (1') and (2') which are the image of (1) and (2) in the reflecting plane. Since the direction of the sound path from these transmitters to the receivers is not parallel with the line (A—A) the vector sum cannot be zero. Thus it will be seen that the two transmitters located a half wave-length apart and a single receiver placed at some point on the straight line passing through the two receivers gives a combination that is very insensitive to the direct sound from the transmitters but sensitive in general to the echoes of the signals from the transmitters.

If, however, the two receivers are alike and are spaced ½ wave length apart along the line (A—A) and are connected in series or in parallel so that the output from the two will be equal to the vector sum, then the pair give practically zero response to the direct sound from the two transmitters and respond with about twice the sensitivity of a single receiver to the echoes. Thus the combination of two transmitters and two receivers is to be preferred to two transmitters and a single receiver. And it becomes obvious that some advantage would be given by employing several transmitters and several receivers, the spacing along the line (A—A) being made equal to an odd number of half wave-lengths, but in general one half wave-length spacing being preferred.

Finally it is to be noticed that a single transmitter and two equal receivers located along the same straight line with the spacing between the two receivers made equal to a half wave-length of the transmitted sound (or an odd number of half wavelengths) and the receivers connected in series or parallel so that the combined output will be equal to the vector sum will be very insensitive to the direct sound from the transmitter but will respond to the echo so long as the direction of the echo is not parallel with the line passing through the transmitter and receivers.

Having described my invention I claim:—

1. In apparatus for ranging by direct sound waves and echoes derived therefrom, the combination of a pair of transmitting devices, a pair of receiving devices located in a plane passing through and cooperating with said transmitting devices, the units of each pair of said devices being spaced apart substantially one half wave length of said sound waves whereby the receivers remain unresponsive to direct waves but are readily affected by the resulting echoes.

2. In apparatus for ranging by sound waves including a plurality of transmitters, the method of gaining null response of direct waves at a point positioned in the plane passing through said transmitters which consists in spacing the transmitters apart a distance substantially equal to one-half a wave length of said sound waves.

3. In a system for determining distances by sound waves including a pair of transmitting devices and a pair of receiving devices operatively associated therewith the method of gaining maximum response to said waves which consists in spacing apart the devices comprising each respective pair, a distance substantially equal to a sub-multiple of a wave length of said sound waves.

HARVEY C. HAYES.